(12) United States Patent
Lei et al.

(10) Patent No.: US 11,658,774 B2
(45) Date of Patent: May 23, 2023

(54) DETERMINING A RESOURCE FIELD THAT CARRIES FEEDBACK INFORMATION

(71) Applicant: Motorola Mobility LLC, Chicago, IL (US)

(72) Inventors: Haipeng Lei, Beijing (CN); Chenxi Zhu, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 116 days.

(21) Appl. No.: 16/499,685

(22) PCT Filed: Mar. 31, 2017

(86) PCT No.: PCT/CN2017/078980
§ 371 (c)(1),
(2) Date: Sep. 30, 2019

(87) PCT Pub. No.: WO2018/176378
PCT Pub. Date: Oct. 4, 2018

(65) Prior Publication Data
US 2020/0044780 A1    Feb. 6, 2020

(51) Int. Cl.
*H04W 4/00*      (2018.01)
*H04L 1/1607*    (2023.01)
(Continued)

(52) U.S. Cl.
CPC .......... *H04L 1/1671* (2013.01); *H04L 1/1893* (2013.01); *H04L 1/1896* (2013.01); *H04L 5/0055* (2013.01); *H04W 72/0446* (2013.01)

(58) Field of Classification Search
None
See application file for complete search history.

(56) References Cited

U.S. PATENT DOCUMENTS 8,305,982 B2 *  11/2012  Zhang .................... H04J 13/16
                                            370/329
10,608,802 B2 *  3/2020  He ....................... H04L 1/1864
(Continued)

FOREIGN PATENT DOCUMENTS

CN    103001750 A    3/2013
CN    103188061 A    7/2013
(Continued)

OTHER PUBLICATIONS

PCT/CN2017/078980, Notification of Transmittal of the International Search Report and the Written Opinion of the International Searching Authority, or the Declaration, PCT, dated Dec. 29, 2017, pp. 1-11.
(Continued)

*Primary Examiner* — Bob A Phunkulh
(74) *Attorney, Agent, or Firm* — Kunzler Bean & Adamson

(57) ABSTRACT

Apparatuses, methods, and systems are disclosed for determining a resource field that carries feedback information. One apparatus (200) includes a transmitter (210) that transmits (502) data. The apparatus (200) includes a processor (202) that determines (504), based on transmission of the data, a resource field that carries feedback information corresponding to the data. The resource field is contained in control signaling. The apparatus (200) includes a receiver (212) that receives (506) the control signaling.

18 Claims, 6 Drawing Sheets

(51) Int. Cl.
  *H04L 1/1867* (2023.01)
  *H04L 5/00* (2006.01)
  *H04W 72/0446* (2023.01)

(56) References Cited

U.S. PATENT DOCUMENTS

| | | | | |
|---|---|---|---|---|
| 2008/0298387 | A1* | 12/2008 | Lohr | H04L 1/1671 370/467 |
| 2009/0199063 | A1* | 8/2009 | Chun | H04L 5/0016 714/749 |
| 2010/0151874 | A1* | 6/2010 | Cai | H04L 1/0039 455/452.1 |
| 2010/0172318 | A1* | 7/2010 | Zhu | H04B 1/713 370/330 |
| 2010/0296454 | A1* | 11/2010 | Park | H04L 1/1812 370/328 |
| 2011/0111788 | A1* | 5/2011 | Damnjanovic | H04W 52/343 455/522 |
| 2012/0275409 | A1* | 11/2012 | Han | H04L 1/0083 370/329 |
| 2013/0142076 | A1* | 6/2013 | Ramos | H04W 24/00 370/254 |
| 2014/0192730 | A1* | 7/2014 | Seo | H04L 5/0053 370/329 |
| 2014/0254455 | A1* | 9/2014 | Nikopour | H04W 72/0466 370/312 |
| 2014/0269338 | A1 | 9/2014 | Jung et al. | |
| 2014/0314012 | A1* | 10/2014 | Tang | H04W 76/00 370/329 |
| 2015/0085711 | A1* | 3/2015 | Wang | H04W 74/02 370/280 |
| 2015/0173048 | A1* | 6/2015 | Seo | H04L 1/0031 370/329 |
| 2015/0244510 | A1* | 8/2015 | Chae | H04L 1/1893 370/329 |
| 2016/0095126 | A1* | 3/2016 | Sridhar | H04W 28/08 370/328 |
| 2017/0019882 | A1* | 1/2017 | Nimbalker | H04W 74/02 |
| 2017/0019894 | A1* | 1/2017 | Nimbalker | H04L 5/0053 |
| 2017/0134960 | A1* | 5/2017 | Zhang | H04L 1/1893 |
| 2017/0215201 | A1* | 7/2017 | Kim | H04L 1/1812 |
| 2018/0049185 | A1* | 2/2018 | Lee | H04L 5/0044 |
| 2018/0049192 | A1* | 2/2018 | Beale | H04B 7/0617 |
| 2018/0098337 | A1* | 4/2018 | Lee | H04W 72/1278 |
| 2018/0115975 | A1* | 4/2018 | Takeda | H04L 1/16 |
| 2018/0145796 | A1* | 5/2018 | Liang | H04L 1/1861 |
| 2018/0159675 | A1* | 6/2018 | Yang | H04L 5/001 |
| 2018/0160425 | A1* | 6/2018 | Wiberg | H04L 1/1614 |
| 2018/0167126 | A1* | 6/2018 | Wiberg | H04L 1/1854 |
| 2018/0206224 | A1* | 7/2018 | Hwang | H04L 5/0055 |
| 2018/0212717 | A1* | 7/2018 | Yang | H04L 5/0055 |
| 2018/0241530 | A1* | 8/2018 | Takeda | H04W 72/1294 |
| 2018/0262882 | A1* | 9/2018 | You | H04W 72/005 |
| 2018/0316464 | A1* | 11/2018 | Stern-Berkowitz | H04L 1/1657 |
| 2018/0352560 | A1* | 12/2018 | Feng | H04W 72/0413 |
| 2019/0068331 | A1* | 2/2019 | Lee | H04L 1/18 |
| 2019/0081744 | A1* | 3/2019 | Yang | H04W 72/1205 |
| 2019/0097779 | A1* | 3/2019 | Wu | H04L 1/1858 |
| 2019/0140804 | A1* | 5/2019 | Tang | H04L 1/1854 |
| 2020/0236698 | A1* | 7/2020 | Takeda | H04L 1/1819 |
| 2020/0260527 | A1* | 8/2020 | Xiong | H04L 5/0073 |
| 2020/0305129 | A1* | 9/2020 | Lee | H04L 5/0053 |
| 2020/0305151 | A1* | 9/2020 | Shimezawa | H04L 5/0091 |

FOREIGN PATENT DOCUMENTS

| | | |
|---|---|---|
| CN | 103384189 A | 11/2013 |
| CN | 103384393 A | 11/2013 |

OTHER PUBLICATIONS

ZTE et al., "Basic Grant-free Transmission for URLLC", 3GPP TSG RAN WG1 Meeting #88 R1-1701594, Feb. 13-17, 2017, pp. 1-8.

LG Electronics, "Discussion on grant-based and grant-free UL transmissions for latency", 3GPP TSG RAN WG1 Meeting #88 R1-1702490, Feb. 13-17, 2017, pp. 1-9.

Lenovo et al., "HARQ design for UL grant-free URLLC transmission", 3GPP TSG RAN WG1 Meeting #88 R1-1702667, Feb. 13-17, 2017, pp. 1-3.

3GPP, "3rd Generation Partnership Project; Technical Specification Group Radio Access Network; Study on Scenarios and Requirements for Next Generation Access Technologies; (Release 15)", 3GPP TR 38.913 V15.0.0, Jun. 2018, pp. 1-39.

Ericsson, "On UL grant-free transmission", 3GPP TSG-RAN WG1 #88 R1-1701871, Feb. 13-17, 2017, pp. 1-2.

Huawei et al., "UL Grant-free transmission", 3GPP TSG RAN WG1 Meeting #88 R1-1701665, Feb. 13-17, 2017, pp. 1-15.

* cited by examiner

DETERMINING A RESOURCE FIELD THAT CARRIES FEEDBACK INFORMATION

FIELD

The subject matter disclosed herein relates generally to wireless communications and more particularly relates to determining a resource field that carries feedback information.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, a high carrier frequency (e.g., >6 GHz) may be used, such as millimeter wave. In some networks, DL TBs may be carried on a PDSCH. In various configurations, a maximum of two TBs may be transmitted on a PDSCH in one serving cell and in one subframe. In such configurations, HARQ-ACK feedback bits corresponding to a PUSCH may be transmitted by either a new data indicator ("NDI") bit in PDCCH or one bit in PHICH.

In some network configurations, diverse services in a common carrier with the same or different numerologies may be supported. In various configurations, different traffic types may have different key performance indicator ("KPI") requirements (e.g., compared to eMBB, URLLC may have a shorter latency tolerance and higher transmission reliability). In certain configurations, one-way user plane latency for URLLC may be 0.5 ms for both UL and DL, and a corresponding latency requirement for eMBB may be 4 ms for both UL and DL.

In certain network configurations, for transmission reliability, 32 bytes of URLLC traffic may have a transmission success probability of $1 \times 10^{-5}$ within a duration of 1 ms. In various configurations, the transmission success probability for UL eMBB data transmission may be $1 \times 10^{-1}$.

In some network configurations, SR triggered and scheduling-based UL transmission may not facilitate a URLLC traffic latency requirement of 0.5 ms after the UL traffic is pushed to the buffer for transmission. In certain network configurations, for fast UL transmission, grant-free based UL transmission may be used. In various network configurations, because grant-free UL transmission may transmit UL data as soon as the UL traffic is pushed to a buffer, a UE may not have to transmit SR and wait for UL grant. In this way, UL URLLC in grant-free transmission may facilitate a URLLC traffic latency requirement of 0.5 ms.

In one network configuration, to avoid a misunderstanding between a gNB and a URLLC UE on a used transmission resource, a transmission resource pool for grant-free UL URLLC transmission may be preconfigured by the gNB and indicated to the URLLC UE by RRC signaling so that the URLLC UE may know the resource pool and transmit its data within the resource pool without waiting for an UL grant.

In some configurations, a bandwidth for URLLC may be contiguous in a frequency domain in order to avoid resource fragmentation, such as configurations in which different numerologies are used for eMBB and URLLC services. In such configurations, a semi-static resource pool may be configured for grant-free UL URLLC transmission so that a gNB may adjust the URLLC resource pool size according to the UL URLLC traffic load variation.

In certain configurations, compared to a scheduling based transmission, grant-free based uplink transmission may lack transmission reliability, such as in configurations in which multiple UEs select a same time-frequency resource for autonomous uplink transmission. In such configurations, overlapping transmission resource selection may lead to mutual interference and it may be difficult for transmission reliability to reach $1 \times 10^{-5}$ within one millisecond. Accordingly, HARQ transmission may be used for grant-free based uplink URLLC transmission.

In configurations in which synchronous HARQ for uplink grant-free transmission are used, if a UE transmits a TB in PUSCH in subframe n and receives NACK in subframe n+x, then the UE may retransmit the TB in PUSCH in subframe n+x+k. In such configurations, the value of x and k may be dependent on a gNB and/or a UE processing time and air interface transmission delay, and x and k may be fixed in a specification for simplicity. Accordingly, with synchronous HARQ for uplink transmission, the gNB may be able to tell the exact subframe in which a retransmission occurs after it sends a HARQ-ACK corresponding to a previous received PUSCH. In configurations in which non-adaptive retransmission is supported for UL grant-free URLLC transmission, retransmission may be triggered by a one-bit NACK. This non-adaptive synchronous HARQ for UL grant-free URLLC transmission may not only reduces signaling overhead but may simplify a UE's blind detection, because the original transmission and retransmission may use the same time-frequency resource and modulation coding scheme ("MCS"). In various configurations, this may be true because UL URLLC may be used to send a small payload size with a low latency. In some configurations, at a gNB, the gNB may combine a received signal with a previous transmission and/or retransmission for further decoding. In various configurations, by using synchronous HARQ performance gain may be improved.

In some configurations, for HARQ-ACK signaled to a UE for UL grant-free transmitted PUSCH, a PHICH channel may be used to indicate an ACK or NACK corresponding to a received PUSCH. However, in such configurations, the PHICH channel may impact a PDCCH channel, such as by reducing its capacity and reliability. In certain configurations, common DCI may be used to indicate ACK/NACK to multiple UEs and each field in the DCI may be preassigned via RRC signaling to a specific UE. However, preassigning fields may lead to low resource utilization efficiency and limited capacity in configurations in which a large number of UEs are working in an UL grant-free transmission mode in which the UEs have infrequent UL traffic.

BRIEF SUMMARY

Apparatuses for determining a resource field that carries feedback information are disclosed. Methods and systems also perform the functions of the apparatus. In one embodiment, the apparatus includes a transmitter that transmits data. In certain embodiments, the apparatus includes a processor that determines, based on transmission of the data, a resource field that carries feedback information corresponding to the data. In various embodiments, the resource field is contained in control signaling. In some embodiments, the apparatus includes a receiver that receives the control signaling.

In one embodiment, the feedback information includes hybrid automatic repeat request feedback. In a further embodiment, the feedback information indicates an ACKNOWLEDGEMENT in response to the data being correctly decoded and a NEGATIVE ACKNOWLEDGEMENT in response to the data not being correctly decoded. In certain embodiments, a time offset between receiving the control signaling and transmitting the data is configurable. In various embodiments, a time offset between receiving the control signaling and transmitting the data is fixed. In some embodiments, the resource field is determined based on at least one parameter corresponding to transmitting the data. In one embodiment, the at least one parameter corresponding to transmitting the data includes a subchannel index in response to the data being transmitted on at least one subchannel, and the subchannel index is lower than other subchannel indexes of the at least one subchannel.

In certain embodiments, the at least one parameter corresponding to transmitting the data includes a physical resource block index in response to the data being transmitted on at least one physical resource block, and the physical resource block index is lower than other physical resource block indexes of the at least one physical resource block. In some embodiments, the at least one parameter corresponding to transmitting the data includes a demodulation reference signal sequence index of a demodulation reference signal sequence, a cyclic shift index of the demodulation reference signal sequence, or some combination thereof. In one embodiment, the at least one parameter corresponding to transmitting the data includes a remote unit signature index. In various embodiments, the at least one parameter corresponding to transmitting the data includes a subchannel index, a total number of resource fields provided by the control signaling, a demodulation reference signal sequence index of a demodulation reference signal sequence or a cyclic shift index of the demodulation reference signal sequence, a remote unit signature index, or some combination thereof. In certain embodiments, the control signaling is common to multiple remote units, and the control signaling includes a configurable radio network temporary identifier.

A method for determining a resource field that carries feedback information, in one embodiment, includes transmitting data. In certain embodiments, the method includes determining, based on transmission of the data, a resource field that carries feedback information corresponding to the data. In some embodiments, the resource field is contained in control signaling. In various embodiments, the method includes receiving the control signaling.

In one embodiment, an apparatus includes a receiver that receives data. In certain embodiments, the apparatus includes a processor that determines, based on transmission of the data, a resource field that carries feedback information corresponding to the data. In various embodiments, the resource field is contained in control signaling. In some embodiments, the apparatus includes a transmitter that transmits the control signaling.

In one embodiment, the feedback information includes hybrid automatic repeat request feedback. In a further embodiment, the feedback information indicates an ACKNOWLEDGEMENT in response to the data being correctly decoded and a NEGATIVE ACKNOWLEDGEMENT in response to the data not being correctly decoded. In certain embodiments, a time offset between transmitting the control signaling and receiving the data is configurable. In some embodiments, a time offset between transmitting the control signaling and receiving the data is fixed. In one embodiment, the resource field is determined based on at least one parameter corresponding to receiving the data.

In some embodiments, the at least one parameter corresponding to receiving the data includes a subchannel index in response to the data being received on at least one subchannel, and the subchannel index is lower than other subchannel indexes of the at least one subchannel. In certain embodiments, the at least one parameter corresponding to receiving the data includes a physical resource block index in response to the data being received on at least one physical resource block, and the physical resource block index is lower than other physical resource block indexes of the at least one physical resource block. In various embodiments, the at least one parameter corresponding to receiving the data includes a demodulation reference signal sequence index of a demodulation reference signal sequence, a cyclic shift index of the demodulation reference signal sequence, or some combination thereof. In one embodiment, the at least one parameter corresponding to receiving the data includes a remote unit signature index. In some embodiments, the at least one parameter corresponding to receiving the data includes a subchannel index, a total number of resource fields provided by the control signaling, a demodulation reference signal sequence index of a demodulation reference signal sequence or a cyclic shift index of the demodulation reference signal sequence, a remote unit signature index, or some combination thereof. In certain embodiments, the control signaling is common to multiple remote units, and the control signaling includes a configurable radio network temporary identifier.

A method for determining a resource field that carries feedback information, in one embodiment, includes receiving data. In certain embodiments, the method includes determining, based on transmission of the data, a resource field that carries feedback information corresponding to the data. In some embodiments, the resource field is contained in control signaling. In various embodiments, the method includes transmitting the control signaling.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
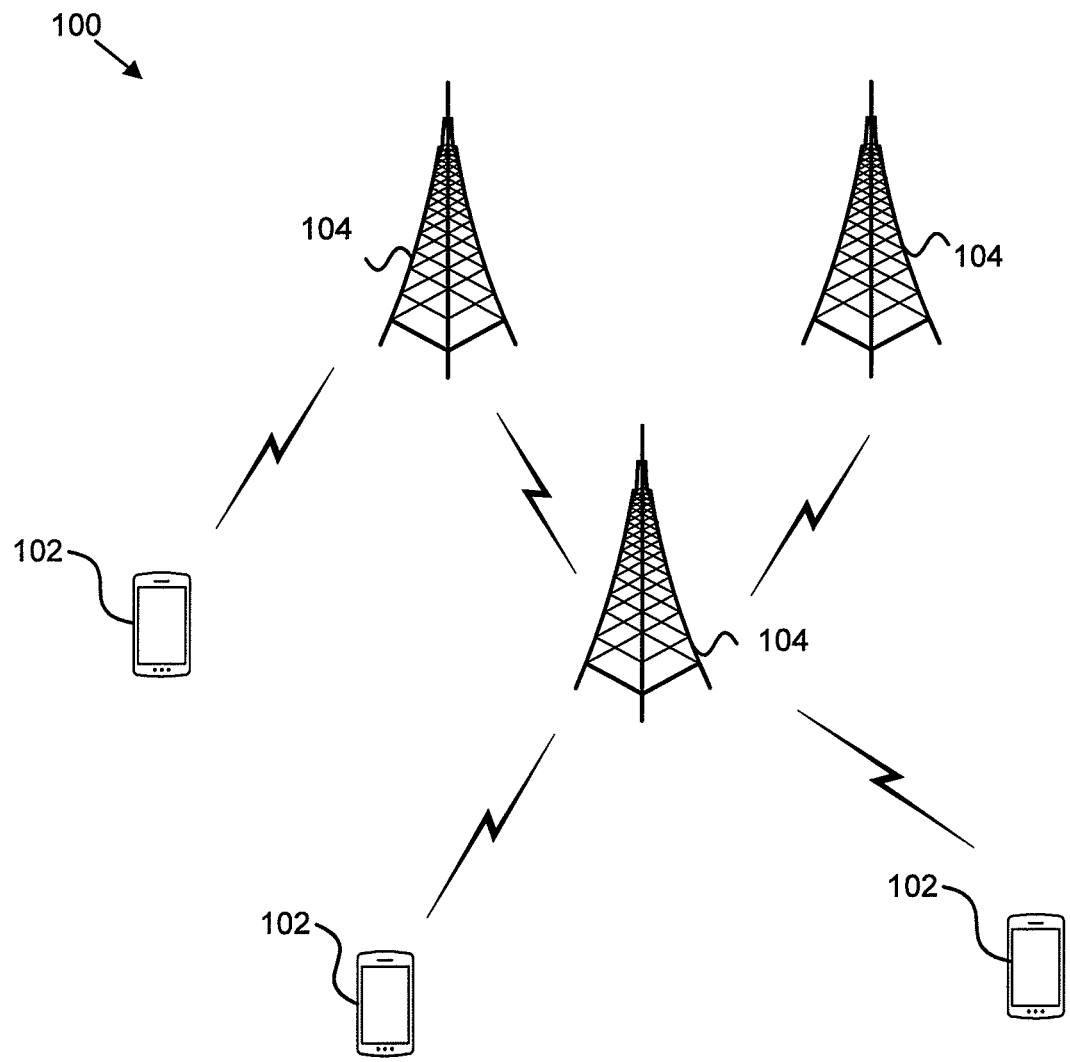
FIG. 1 is a schematic block diagram illustrating one embodiment of a wireless communication system for determining a resource field that carries feedback information.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining a resource field that carries feedback information. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may transmit data to a base unit 104. In certain embodiments, the remote unit 102 may determine, based on transmission of the data, a resource field that carries feedback information corresponding to the data. In some embodiments, the resource field is contained in control signaling. In various embodiments, the remote unit 102 may receive the control signaling from the base unit 104. Accordingly, a remote unit 102 may be used for determining a resource field that carries feedback information.

In certain embodiments, a base unit 104 may receive data from the remote unit 102. In certain embodiments, the base unit 104 may determine, based on transmission of the data, a resource field that carries feedback information corresponding to the data. In some embodiments, the resource field is contained in control signaling. In various embodiments, the base unit 104 may transmit the control signaling. Accordingly, a base unit 104 may be used for determining a resource field that carries feedback information.

As used herein, based on transmission of the data may refer to how the data is transmitted, how the data is received, information corresponding to the data, and/or the data itself. For example, based on transmission of the data may refer to being based on a subchannel index, a PRB index, a DMRS sequence index, a cyclic shift index, a remote unit 102 signature index, and so forth corresponding to the data.

Figure 2:
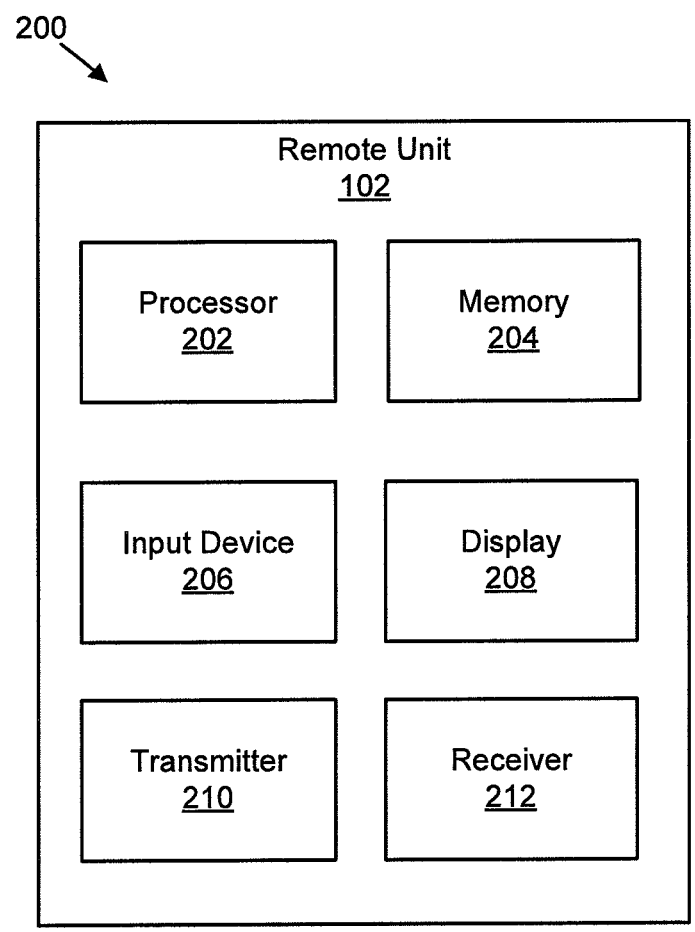
FIG. 2 is a schematic block diagram illustrating one embodiment of an apparatus that may be used for determining a resource field that carries feedback information.

FIG. 2 depicts one embodiment of an apparatus 200 that may be used for determining a resource field that carries feedback information. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In one embodiment, the processor 202 determines, based on transmission of the data, a resource field that carries feedback information corresponding to the data. In various embodiments, the resource field is contained in control signaling. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to resource fields. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In certain embodiments, the transmitter 210 may be used to transmit data. In certain embodiments, the receiver 212 may be used to receive control signaling. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
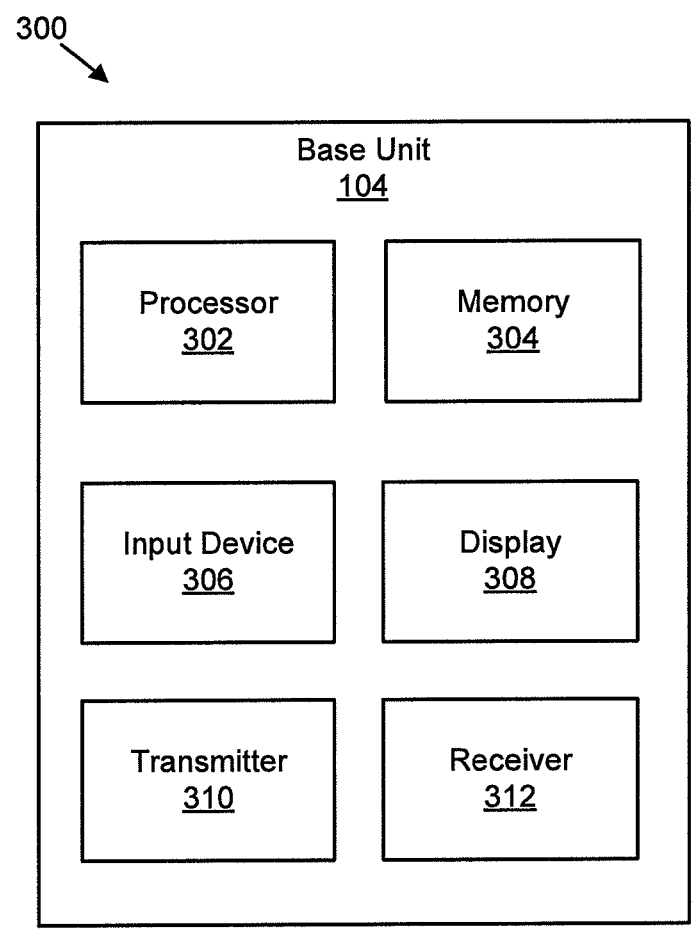
FIG. 3 is a schematic block diagram illustrating one embodiment of an apparatus that may be used for determining a resource field that carries feedback information.

FIG. 3 depicts one embodiment of an apparatus 300 that may be used for determining a resource field that carries feedback information. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 may be used to receive data. In certain embodiments, the processor 302 may be used to determine, based on transmission of the data, a resource field that carries feedback information corresponding to the data. In some embodiments, the resource field is contained in control signaling. In various embodiments, the transmitter 310 may be used to transmit the control signaling. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
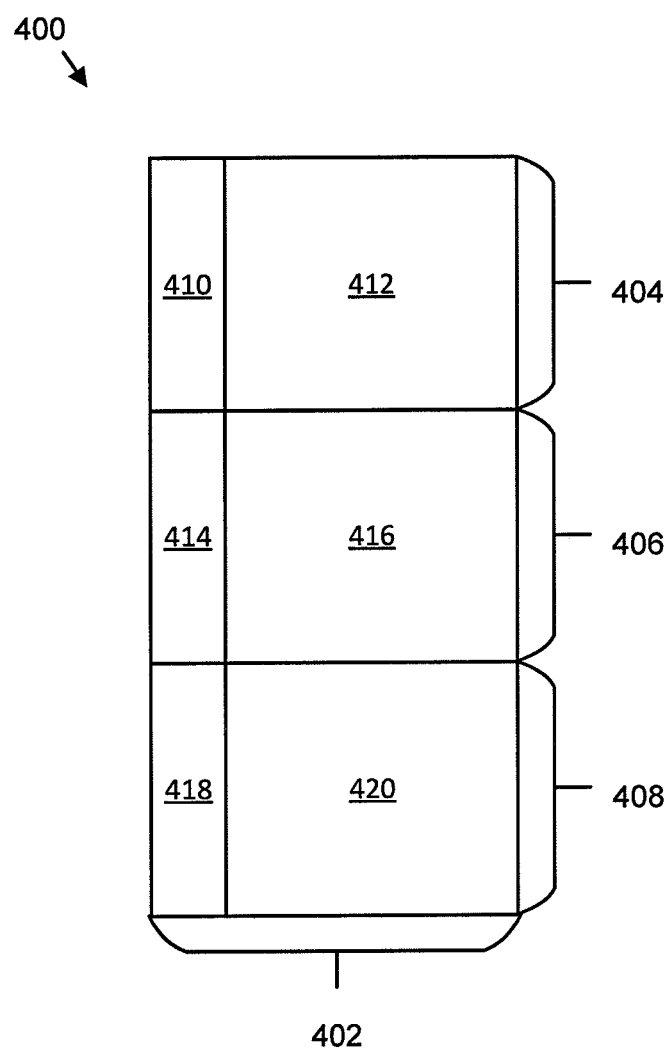
FIG. 4 illustrates one embodiment of subchannels for UL grant-free transmission.

FIG. 4 illustrates one embodiment of subchannels 400 for UL grant-free transmission. The subchannels 400 are transmitted over a slot 402. Specifically, the subchannels 400 include a first subchannel 404, a second subchannel 406, and a third subchannel 408. The first subchannel 404 includes a first demodulation reference signal ("DMRS") 410 and first data 412. Moreover, the second subchannel 406 includes a second DMRS 414 and second data 416. Further, the third subchannel 408 includes a third DMRS 418 and third data 420.

In certain embodiments, an implicit HARQ-ACK field indication may be used to enable a remote unit 102 to detect HARQ-ACK in a determined resource field of a common DCI so that the remote unit 102 may either stop a retransmission or start a new transmission in response to receiving an ACK, or trigger a retransmission in response to receiving a NACK.

In various embodiments, a remote unit 102 in UL grant-free transmission mode may detect a HARQ-ACK corresponding to a grant-free PUSCH transmission in an $s^{th}$ HARQ-ACK resource field of a common DCI in slot n+x after it transmits the grant-free PUSCH in slot n.

In one embodiment, the value of x may be semi-statically configured by RRC signaling. In such an embodiment, the value of x may be a non-negative integer. By having a semi-statically configured x, a base unit 104 may balance HARQ-ACK overhead in multiple slots. For example, assuming that a number of remote units 102 transmitting grant-free PUSCH in one slot is larger than a number of maximum HARQ-ACK fields provided by a common DCI, the base unit 104 may configure different values of x to remote units 102 so that a common DCI in one slot may accommodate a number of remote units 102 that try to detect the common DCI in this slot. In certain embodiments, the value of x may be fixed in a specification. In such embodiments, there may be an insufficient number of HARQ-ACK resource fields for a total number of remote units 102.

In some embodiments, the value of s may be implicitly derived (e.g., using an equation) based on a subchannel index (e.g., a lowest subchannel index out of all of the subchannel indexes, a subchannel index that is lower than other subchannel indexes out of multiple subchannels), a PRB index (e.g., a lowest PRB index out of all of the PRB indexes out of multiple PRBs, a PRB index that is lower than other PRB indexes out of multiple PRBs), a DMRS sequence index of a DMRS sequence, a cyclic shift index of a DMRS sequence, and/or a remote unit 102 signature index.

In various embodiments, a subchannel index may be used for calculating a resource field index of s if a resource pool is preconfigured for UL grant-free transmission and concrete time-frequency resources are partitioned to multiple subchannels. In such embodiments, each subchannel may have an equal bandwidth in a frequency domain and an equal duration in a time domain. In certain embodiments, the duration in the time domain may be a slot or a mini-slot (e.g., portion of a slot) preconfigured by a base unit 104 via RRC signaling. One example of a time and frequency resources is illustrated in FIG. 4.

In certain embodiments, if a remote unit 102 occupies multiple consecutive subchannels, then the subchannel index may be the lowest subchannel index (e.g., a subchannel index with a lower number than the other subchannel indexes). In some embodiments, if the subchannel with the lowest subchannel index is not preconfigured, then a lowest PRB index of transmitted PUSCH may be used for calculation (e.g., a PRB index with a lower number than other PRB indexes).

In some embodiments, a DMRS sequence index may be used for calculating the resource field index of s in embodiments in which multiple remote units 102 are configured with an orthogonal DMRS sequence. In various embodiments, if a number of available DMRS sequences cannot satisfy a demand of remote unit 102 numbers, a cyclic shift index of a DMRS sequence may be used. In some embodiments, a DMRS sequence space may be defined for grant-free UL URLLC transmission.

In various embodiments, a remote unit 102 signature index may be used for calculating the resource field index of s in embodiments in which a base unit 104 has a capability of non-orthogonal multiple access ("NOMA") (e.g., multi-user detection to jointly decode multiple remote units 102 transmitting on a same time-frequency resource). For example, for sparse code multiple access ("SCMA"), a remote unit 102 signature index may be a codeword index. As another example, for multi-user shared access ("MUSA") or resource spread multiple access ("RSMA"), a remote unit 102 signature index may be a sequence index. As a further example, for interleave division multiple access ("IDMA"), a remote unit 102 signature index may be an interleaver pattern index. In some configurations, a remote unit 102 signature index may be preconfigured by a base unit 104 or random selected by a remote unit 102.

In certain embodiments, an equation for calculating a resource field index s of a common DCI may be:

$$s=(\lfloor f_{subchannel\_PRB}/N_{total}\rfloor+n_{DMRS}+n_{signature})\bmod N_{total}$$

In such an equation, $N_{total}$ is the total fields provided by a common DCI (e.g., a payload size), and $f_{subchannel\_PRB}$ is a subchannel index in embodiments in which the remote unit 102 occupies a single subchannel or a lowest subchannel index in embodiments in which the remote unit 102 occupies multiple consecutive subchannels if a resource pool is preconfigured and partitioned into multiple subchannels. If such subchannel is not preconfigured, then $f_{subchannel\_PRB}$ is a lowest PRB index of transmitted PUSCH. In the equation, $n_{DMRS}$ is a configured DMRS sequence index or a cyclic shift index of a DMRS sequence, and $n_{signature}$ is a remote unit 102 signature index preconfigured by a base unit 104 or random selected by a remote unit 102.

In various embodiments, a common DCI may be common to a remote unit 102 group and may have a specific RNTI for CRC scrambling. In some embodiments, the specific RNTI may be preconfigured by the base unit 104 via RRC signaling.

In certain embodiments, after obtaining the resource field index of s, a remote unit 102 may detect a corresponding field of the common DCI in slot n+x. Thus, by determining the timing relationship, a remote unit 102 may identify a HARQ-ACK bit in the $s^{th}$ field the is for the grant-free PUSCH transmitted in slot n. In response to the HARQ-ACK bit being ACK or a predefined indicator (e.g., "1" in a one-bit field), the remote unit 102 may stop a retransmission and/or start a new transmission. In response to the HARQ-ACK bit being NACK or a predefined indicator (e.g., "0" in a one-bit field), the remote unit 102 may perform a retransmission. By using the resource field index s, a remote unit 102 may implicitly know in which field to receive the UL HARQ-ACK feedback without a signaling indication.

Figure 5:
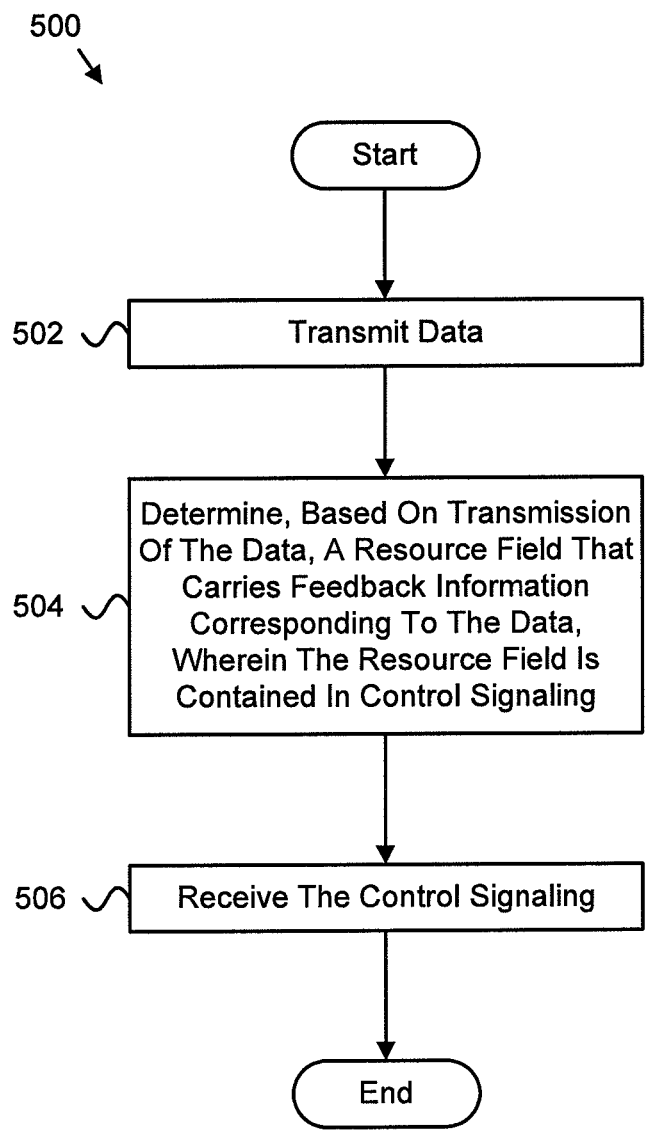
FIG. 5 is a schematic flow chart diagram illustrating one embodiment of a method for determining a resource field that carries feedback information.

FIG. 5 is a schematic flow chart diagram illustrating one embodiment of a method 500 for determining a resource field that carries feedback information. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include transmitting 502 data. In certain embodiments, the method 500 includes determining 504, based on transmission of the data, a resource field that carries feedback information corresponding to the data. In some embodiments, the resource field is contained in control signaling. In various embodiments, the method 500 includes receiving 506 the control signaling.

In one embodiment, the feedback information includes hybrid automatic repeat request feedback. In a further embodiment, the feedback information indicates an ACKNOWLEDGEMENT in response to the data being correctly decoded and a NEGATIVE ACKNOWLEDGEMENT in response to the data not being correctly decoded. In certain embodiments, a time offset between receiving the control signaling and transmitting the data is configurable. In various embodiments, a time offset between receiving the control signaling and transmitting the data is fixed. In some embodiments, the resource field is determined based on at least one parameter corresponding to transmitting the data. In one embodiment, the at least one parameter corresponding to transmitting the data includes a subchannel index in response to the data being transmitted on at least one subchannel, and the subchannel index is lower than other subchannel indexes of the at least one subchannel.

In certain embodiments, the at least one parameter corresponding to transmitting the data includes a physical resource block index in response to the data being transmitted on at least one physical resource block, and the physical resource block index is lower than other physical resource block indexes of the at least one physical resource block. In some embodiments, the at least one parameter corresponding to transmitting the data includes a demodulation reference signal sequence index of a demodulation reference signal sequence, a cyclic shift index of the demodulation reference signal sequence, or some combination thereof.

In one embodiment, the at least one parameter corresponding to transmitting the data includes a remote unit signature index. In various embodiments, the at least one parameter corresponding to transmitting the data includes a subchannel index, a total number of resource fields provided by the control signaling, a demodulation reference signal sequence index of a demodulation reference signal sequence or a cyclic shift index of the demodulation reference signal sequence, a remote unit signature index, or some combination thereof. In certain embodiments, the control signaling is common to multiple remote units, and the control signaling includes a configurable radio network temporary identifier.

Figure 6:
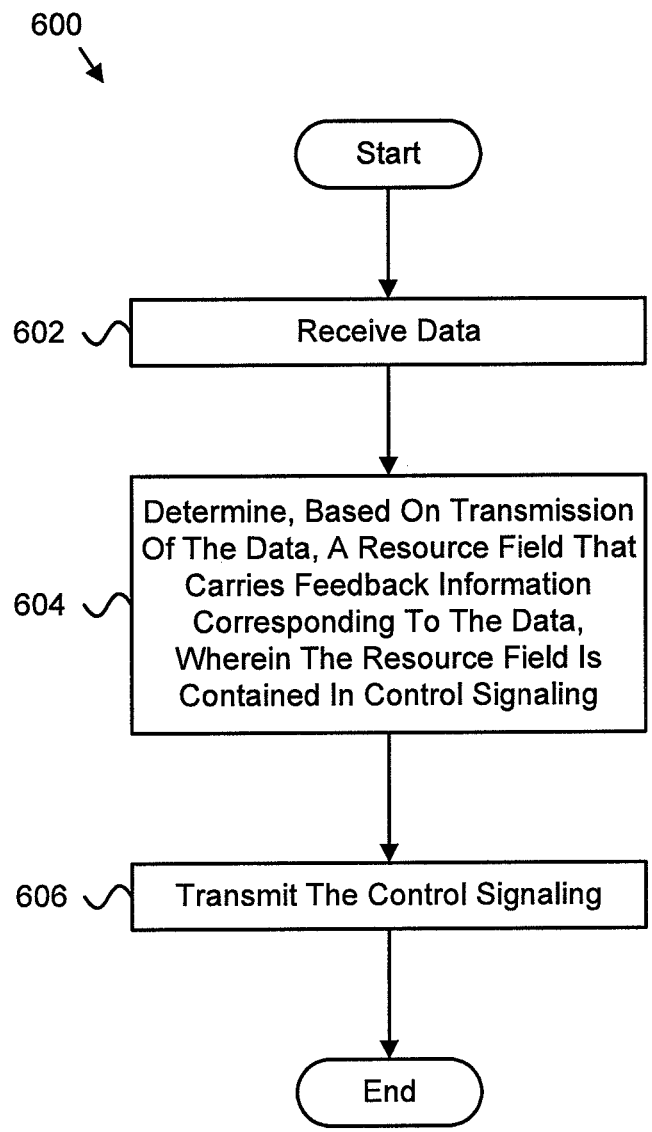
FIG. 6 is a schematic flow chart diagram illustrating another embodiment of a method for determining a resource field that carries feedback information.

FIG. 6 is a schematic flow chart diagram illustrating another embodiment of a method 600 for determining a resource field that carries feedback information. In some embodiments, the method 600 is performed by an apparatus, such as the base unit 104. In certain embodiments, the method 600 may be performed by a processor executing program code, for example, a microcontroller, a microprocessor, a CPU, a GPU, an auxiliary processing unit, a FPGA, or the like.

The method 600 may include receiving 602 data. In certain embodiments, the method 600 includes determining 604, based on transmission of the data, a resource field that carries feedback information corresponding to the data. In some embodiments, the resource field is contained in control signaling. In various embodiments, the method 600 includes transmitting 606 the control signaling.

In one embodiment, the feedback information includes hybrid automatic repeat request feedback. In a further embodiment, the feedback information indicates an ACKNOWLEDGEMENT in response to the data being correctly decoded and a NEGATIVE ACKNOWLEDGEMENT in response to the data not being correctly decoded. In certain embodiments, a time offset between transmitting the control signaling and receiving the data is configurable. In some embodiments, a time offset between transmitting the control signaling and receiving the data is fixed. In one embodiment, the resource field is determined based on at least one parameter corresponding to receiving the data.

In some embodiments, the at least one parameter corresponding to receiving the data includes a subchannel index in response to the data being received on at least one subchannel, and the subchannel index is lower than other subchannel indexes of the at least one subchannel. In certain embodiments, the at least one parameter corresponding to receiving the data includes a physical resource block index in response to the data being received on at least one physical resource block, and the physical resource block index is lower than other physical resource block indexes of the at least one physical resource block. In various embodiments, the at least one parameter corresponding to receiving the data includes a demodulation reference signal sequence index of a demodulation reference signal sequence, a cyclic shift index of the demodulation reference signal sequence, or some combination thereof. In one embodiment, the at least one parameter corresponding to receiving the data includes a remote unit signature index. In some embodiments, the at least one parameter corresponding to receiving the data includes a subchannel index, a total number of resource fields provided by the control signaling, a demodulation reference signal sequence index of a demodulation reference signal sequence or a cyclic shift index of the demodulation reference signal sequence, a remote unit signature index, or some combination thereof. In certain embodiments, the control signaling is common to multiple remote units, and the control signaling includes a configurable radio network temporary identifier.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising a user equipment, the apparatus further comprising:
    a transmitter that transmits data to a base station, wherein the transmission of the data from the user equipment to the base station has a corresponding parameter having an index value;
    a processor that determines, based on the parameter of the transmission of the data, a resource field contained in downlink control information that is to carry feedback information from the base station corresponding to the data; and
    a receiver that receives the downlink control information comprising the resource field determined based on:
        the parameter of the transmission of the data;
        a function including a combination of the parameter of the transmission of the data and a value equal to a number of total fields in the downlink control information; and
        at least one parameter corresponding to transmitting the data, wherein the at least one parameter corresponding to transmitting the data comprises a subchannel index in response to the data being transmitted on at least one subchannel, and the subchannel index is lower than other subchannel indexes of the at least one subchannel.

2. A method of a user equipment, the method comprising:
    transmitting data to a base station, wherein the transmission of the data from the user equipment to the base station has a corresponding parameter having an index value;
    determining, based on the parameter of the transmission of the data, a resource field contained in downlink control information that is to carry feedback information from the base station corresponding to the data; and
    receiving the downlink control information comprising the resource field determined based on:
        the parameter of the transmission of the data;
        a function including a combination of the parameter of the transmission of the data and a value equal to a number of total fields in the downlink control information; and
        at least one parameter corresponding to transmitting the data, wherein the at least one parameter corresponding to transmitting the data comprises a subchannel index in response to the data being transmitted on at least one subchannel, and the subchannel index is lower than other subchannel indexes of the at least one subchannel.

3. The method of claim 2, wherein the feedback information comprises hybrid automatic repeat request feedback.

4. The method of claim 2, wherein the feedback information indicates an ACKNOWLEDGEMENT in response to the data being correctly decoded and a NEGATIVE ACKNOWLEDGEMENT in response to the data not being correctly decoded.

5. The method of claim 2, wherein a time offset between receiving the downlink control information and transmitting the data is configurable.

6. The method of claim 2, wherein a time offset between receiving the downlink control information and transmitting the data is fixed.

7. The method of claim 2, wherein the at least one parameter corresponding to transmitting the data comprises a physical resource block index in response to the data being transmitted on at least one physical resource block, and the physical resource block index is lower than other physical resource block indexes of the at least one physical resource block.

8. The method of claim 2, wherein the at least one parameter corresponding to transmitting the data comprises a demodulation reference signal sequence index of a demodulation reference signal sequence, a cyclic shift index of the demodulation reference signal sequence, or some combination thereof.

9. The method of claim 2, wherein the at least one parameter corresponding to transmitting the data comprises a remote unit signature index.

10. The method of claim 2, wherein the at least one parameter corresponding to transmitting the data comprises a subchannel index, a total number of resource fields provided by the downlink control information, a demodulation reference signal sequence index of a demodulation reference signal sequence or a cyclic shift index of the demodulation reference signal sequence, a remote unit signature index, or some combination thereof.

11. The method of claim 2, wherein the downlink control information is common to a plurality of remote units, and the downlink control information comprises a configurable radio network temporary identifier.

12. An apparatus comprising a base station, the apparatus further comprising:
    a receiver that receives data from a user equipment, wherein the transmission of the data from the user equipment to the base station has a corresponding parameter having an index value;
    a processor that determines, based on the parameter of the transmission of the data, a resource field contained in downlink control information that is to carry feedback information from the base station corresponding to the data; and
    a transmitter that transmits the downlink control information comprising the resource field determined based on:
        the parameter of the reception of the data;
        a function including a combination of the parameter of the reception of the data and a value equal to a number of total fields in the downlink control information; and
        at least one parameter corresponding to receiving the data, wherein the at least one parameter corresponding to receiving the data comprises a subchannel index in response to the data being transmitted on at least one subchannel, and the subchannel index is lower than other subchannel indexes of the at least one subchannel.

13. A method of a base station, the method comprising:
receiving data from a user equipment, wherein the transmission of the data from the user equipment to the base station has a corresponding parameter having an index value;
determining, based on the parameter of the transmission of the data, a resource field contained in downlink control information that is to carry feedback information from the base station corresponding to the data; and
transmitting the downlink control information comprising the resource field determined based on:
 the parameter of the transmission reception of the data;
 a function including a combination of the parameter of the reception of the data and a value equal to a number of total fields in the downlink control information; and
 at least one parameter corresponding to receiving the data, wherein the at least one parameter corresponding to receiving the data comprises a subchannel index in response to the data being transmitted on at least one subchannel, and the subchannel index is lower than other subchannel indexes of the at least one subchannel.

14. The method of claim 13, wherein the feedback information comprises hybrid automatic repeat request feedback.

15. The method of claim 13, wherein the feedback information indicates an ACKNOWLEDGEMENT in response to the data being correctly decoded and a NEGATIVE ACKNOWLEDGEMENT in response to the data not being correctly decoded.

16. The method of claim 13, wherein a time offset between transmitting the downlink control information and receiving the data is configurable.

17. The method of claim 13, wherein a time offset between transmitting the downlink control information and receiving the data is fixed.

18. The method of claim 13, wherein the resource field is determined based on at least one parameter corresponding to receiving the data.

* * * * *